United States Patent
Schiffer

(10) Patent No.: US 11,755,875 B2
(45) Date of Patent: Sep. 12, 2023

(54) RING-SHAPED PIECE OF JEWELRY HAVING AN RFID TRANSPONDER

(71) Applicant: EGF-EDUARD G. FIDEL GMBH, Pforzheim (DE)

(72) Inventor: Stefan Schiffer, Pforzheim (DE)

(73) Assignee: EGF-EDUARD G. FIDEL GMBH, Pforzheim (DE)

( * ) Notice: Subject to any disclaimer, the term of this patent is extended or adjusted under 35 U.S.C. 154(b) by 141 days.

(21) Appl. No.: 17/425,849

(22) PCT Filed: Aug. 19, 2020

(86) PCT No.: PCT/EP2020/073223
§ 371 (c)(1),
(2) Date: Jul. 26, 2021

(87) PCT Pub. No.: WO2021/089211
PCT Pub. Date: May 14, 2021

(65) Prior Publication Data
US 2022/0121897 A1 Apr. 21, 2022

(30) Foreign Application Priority Data
Nov. 7, 2019 (DE) ...................... 10 2019 130 012.6

(51) Int. Cl.
*G06K 19/077* (2006.01)
(52) U.S. Cl.
CPC ............................. *G06K 19/07762* (2013.01)
(58) Field of Classification Search
None
See application file for complete search history.

(56) References Cited

U.S. PATENT DOCUMENTS

| 10,416,881 | B2 | 9/2019 | Warren | |
| 2015/0042450 | A1* | 2/2015 | McLear | H04B 1/385 340/5.25 |
| 2015/0235120 | A1* | 8/2015 | Warren | A44C 17/0233 63/1.14 |
| 2017/0373671 | A1* | 12/2017 | Redman-White | H04B 5/0031 |
| 2019/0077117 | A1* | 3/2019 | Schmerler | B32B 9/047 |

FOREIGN PATENT DOCUMENTS

| DE | 198 24 643 A1 | 11/1999 | |
| DE | 20 2013 011 801 U1 | 9/2014 | |
| EP | 2 597 723 A1 | 5/2013 | |
| WO | WO 2018/163876 A1 | 9/2018 | |
| WO | WO-2018163876 A1 * | 9/2018 | ........... G06K 19/077 |

OTHER PUBLICATIONS

International Search Report, issued in PCT/EP2020/073223, dated Nov. 3, 2020.

* cited by examiner

*Primary Examiner* — Kristy A Haupt
(74) *Attorney, Agent, or Firm* — Birch, Stewart, Kolasch & Birch, LLP

(57) ABSTRACT

A ring-shaped piece of jewelry has a metal main body, which forms a receiving opening, and an RFID transponder, in which data that can be read out are stored and which is connected to an antenna structure, by means of which antenna structure signals can be exchanged with a reading device. The RFID transponder is part of a transponder array having at least two additional RFID transponders, which extend peripherally on a peripheral surface of the metal main body, and the transponder array has a distance of 2 to 6 mm between two adjacent RFID transponders.

21 Claims, 4 Drawing Sheets

RING-SHAPED PIECE OF JEWELRY HAVING AN RFID TRANSPONDER

Figure 1:
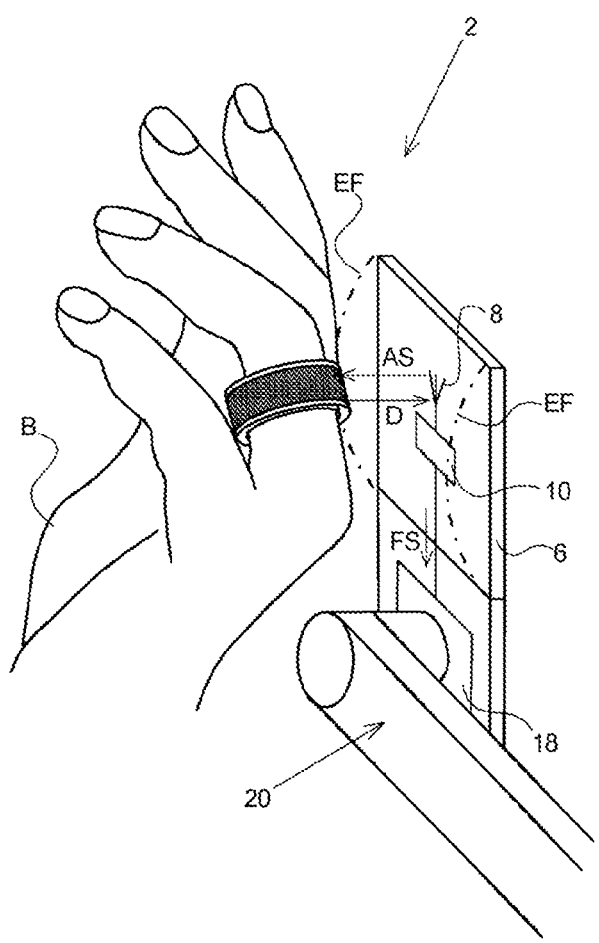

The invention relates to a ring-shaped piece of jewellery, such as for example a finger ring, a bracelet or a pendant, according to the preamble of claim 1 as well as a method for the production of the piece of jewellery and a method for operating a reading device using a piece of jewellery of this sort. Here, the piece of jewellery has a metal main body which forms a receiving opening for fixing the piece of jewellery to a part of the body of the wearer or on a further piece of jewellery, such as for example a chain. In addition, an RFID transponder is provided on the piece of jewellery on which data that can be read out are stored, which for example serve to identify the user or their access or authorisation rights. To this end, the RFID transponder is connected with an antenna structure or itself has an integrated antenna structure by means of which signals can be exchanged with a reading device.

From EP2597723 A1 is known a jewellery ring on which an RFID transponder is accommodated in a recess of a metal main body. In this regard, the RFID transponder is covered to the outside at least partially by an amorphous decorative element arranged on the metal main body.

It is the object of the invention to increase the reliability when reading the stored data in the case of a generic piece of jewellery.

This object is solved by a piece of jewellery with the characteristics of claim 1. Here, the RFID transponder is part of a transponder array having at least two further RFID transponders, which are arranged to this end peripherally on a peripheral surface of the metal main body. By means of the plurality of RFID transponders used, the region of the piece of jewellery in which it is possible to read out the data stored thereon, can be significantly enlarged. In this manner, the reliability of the reading procedures can be significantly increased, since it is possible to transfer without interference the data that can be read out in different positions or orientations of the piece of jewellery with respect to the reading device concerned. In particular when using the piece of jewellery to release an entrance, such as for example by opening an electronic building or vehicle lock, or an access to an IT system, such as for example by means of a reading device connected with a computer workstation, thus error functions can be avoided. By means of the peripherally arranged RFID transponders, the piece of jewellery can in this regard be read out all round and thus for example in the case of a finger ring, bracelet or ring-shaped pendant for a chain, be read out independently of its rotational position. In addition, the transponder array has in this regard a distance of between 2 and 6 mm between two adjacent RFID transponders, in particular in each case between all adjacent RFID transponders, as a result of which, independently of the angular position of the RFID transponders concerned with respect to the reading device, a stable data transmission can be ensured without significant mutual interferences of the RFID transponders occurring.

To this end, the data that can be read out are advantageously stored redundantly on the further RFID transponders, such that the case that it is not possible to read a single RFID transponder or a plurality of RFID transponders of the transponder array, the remaining data can be made available by the remaining RFID transponders.

In addition, it is favourable when the RFID transponders can be designed at least partially as passive transponders, such that they are available without their own power supply and thereby for a virtually unlimited time, in order to be able to transfer the data that can be read out after being activated by an electromagnetic field.

It is furthermore advantageous when the RFID transponders have exclusively or at least partially a near-field antenna integrated into a chip housing. Antennas of this sort can in this regard be especially easily incorporated in the overall appearance of the piece of jewellery or concealed therein, in order not to compromise the optical impression and the value of the piece of jewellery. In addition, by means of the exclusive use of near-field antennas, which facilitate the reading of the RFID transponders only at a distance of, in particular, under 2 cm, it can be avoided that an unauthorised third person is able to read out the data, or that the data that can be read out are unintentionally made available.

Additionally or alternatively to this, it is advantageous when the transponder array has at least one far field antenna with a material length of total at least 8.5 cm. Thereby, the data stored on the piece of jewellery can be reliably transferred also across a distance of more than 2 cm. Here, a good transmission and reception performance can be guaranteed in particular in a frequency range from 850 to 950 MHz. The far field antennas can to this end be integrated into the design on an outer side of the piece of jewellery, such as for example by means of embedding into its surface in an undulating pattern or by means of portions protruding from the surface in a specific design. Alternatively to this, the far field antenna can also be held on the piece of jewellery so as to be able to be folded out.

In any case, the RFID transponders are preferably held in a contactless manner spaced from the metal main body, as a result of which a good transmission and reception performance and, as a result, an especially stable transfer of the data that can be read out from the piece of jewellery to the reading device can be guaranteed.

In an especially advantageous embodiment, the RFID transponders are covered at least partially by a non-metallic material. It is hereby possible to mount the RFID transponders or their antenna structures on the piece of jewellery so as to be, at least for the main part, inconspicuous, without it resulting in substantial interference when reading the stored data. The non-metallic materials can in this regard be used as a design element, such that the design and the valuable impression of the piece of jewellery as a whole can be maintained despite the transponder array accommodated thereon.

It is in this regard advantageous when the non-metallic material is formed at least partially by a carbon fibre structure, a lacquer or a ceramic. Thus, the reduction of the transmission and reception performance of the RFID transponders caused by the covering material can be limited to a minimum. In addition, by means of the use of these materials, the RFID transponders can be offered an especially effective protection against mechanically or chemically acting influences caused for example by knocks, warping or ingress of fluids.

Alternatively or additionally to this, the non-metallic material can be formed advantageously at least partially by gemstones which are formed of a crystalline or amorphous material. In particular, the gemstones can be formed by a monocrystalline material, particular by zirconia. By means of the use of crystalline or amorphous stones or of zirconia stones, the RFID transponders used can be covered in an especially unobtrusive manner and integrated even into high-value jewellery items, such as for example precious metal rings set with precious stones.

Furthermore, the above-mentioned object is solved by a method for the production of a ring-shaped piece of jewellery in one of the above-mentioned embodiments, in which in a first step the RFID transponders are positioned on and fastened to the metallic main body. In a second step, the RFID transponders fastened to the metal main body are enclosed in a carbon fibre material, wherein in a third step the carbon fibre material is subjected to heat in order to bake the RFID transponders into the carbon fibre material. By means of this method, the transponder array can be accommodated in an especially stable and permanently protected manner on the piece of jewellery. By means of the use of the covering carbon fibre material, the interference of the transmitting and receiving performance of the RFID transponders can be reduced to a minimum, such that the identification data stored thereon can be read out without interference.

Advantageously, the RFID transponders are in the first step adhesively bonded to the metal main body with the interposition of a layer of adhesive. Hereby, the RFID transponders can be held precisely in their predetermined position during the baking of the carbon fibre material. In addition, in this manner, the desired spacing of the RFID transponders with respect to the metal of the piece of jewellery can be created, in order to minimise a possible impairment of the transmitting and receiving performance caused by the metal.

Furthermore, it is favourable when the carbon fibre material used in the second step is strip-shaped in form, in order, with simple production, to be able to ensure a stable and closed covering of the RFID transponders.

Advantageously, the RFID transponders are embedded additionally in an aerogel prior to the second step. By means of the extremely thermally-insulating material properties of aerogel, the RFID transponders can be reliably protected against damaging temperature increases and/or temperature gradients during the baking of the carbon fibre material.

Furthermore, the above-mentioned object is solved by a method for operating a reading device which has a ring-shaped piece of jewellery in one of the above-mentioned embodiments and a reading device. In this operational method, in a first step, an activating signal with a transmitting and receiving frequency is transmitted to the piece of jewellery from a transmitting device of the reading device. In a second step, then, the data that can be read out are transferred from the piece of jewellery to a receiving device of the reading device. In this regard, it is provided that the transmission of the activating signal takes place successively with various transmitting and receiving frequencies, which are to this end for example saved in the form of tables on the reading device and are activated in quick succession in each reading procedure. In this manner, it is possible to be able to read out securely the RFID transponders of various pieces of jewellery using one single reading device which retains the same configuration, even when they cause mutual frequency displacements for reasons of their differences in form and material.

Advantageously, the transfer of the data that can be read out takes place here as a function of a predetermined temporal positioning of the piece of jewellery in a receiving region of the reading device. For example, the predetermined temporal positioning can in this regard contain a specific number or a specific sequence of short and long positionings in the receiving region. In any case, by means of an additional coding of this sort, an additional safeguarding of the stored data can be made available, such as, for example, in the case that the piece of jewellery comes into the possession of an unauthorised person.

In an especially advantageous embodiment, the reading device is connected with an electronic and/or mechanical safety device, such as for example an electronic lock of a vehicle or of a building or a release unit for a data processing system. Hereby, the piece of jewellery can be used for the secure identification and authentication of the user, in order to gain access to a secured area. By means of the use of the piece of jewellery as a wearer of the transponder array, the user can in this regard carry in an especially comfortable manner the data that can be read out which function as a key.

Attention is drawn to the fact that all above-described characteristics of the object according to the invention are interchangeable or can be combined, inasmuch as an exchange or a combination of the same is not ruled out for technical reasons.

In the figures is shown an exemplary embodiment of the invention.

Figure 2A:
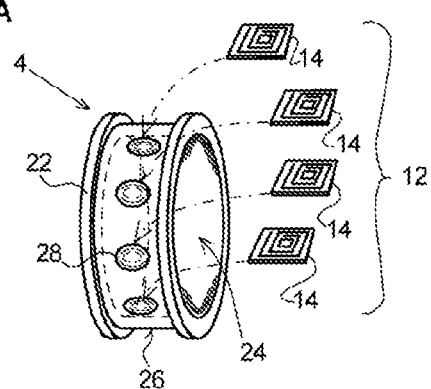
Figure 2B:
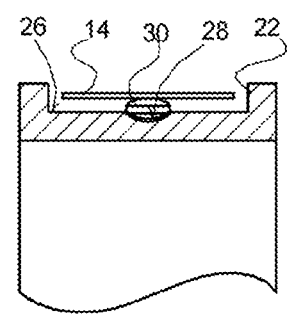
Figure 2C:
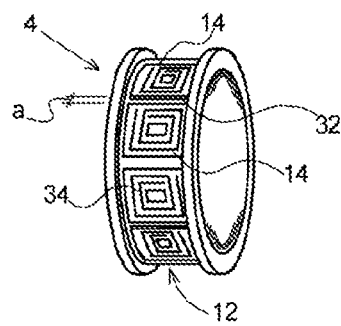
Figure 2D:
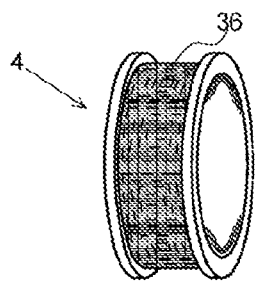
Figure 2E:
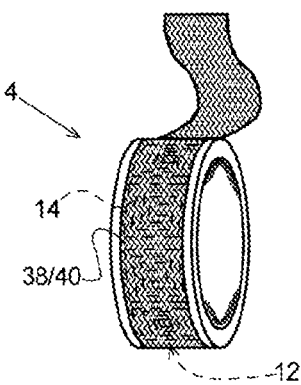
Figure 2F:
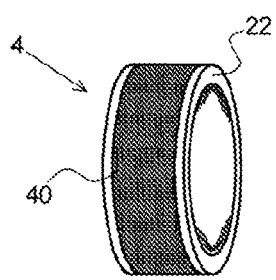
Figure 3:
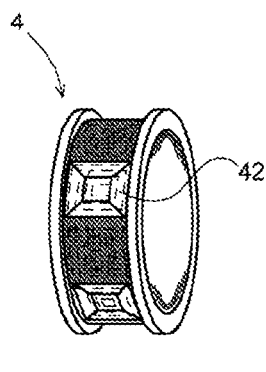
Figure 4:
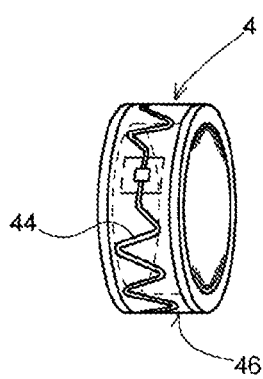
Figure 5:
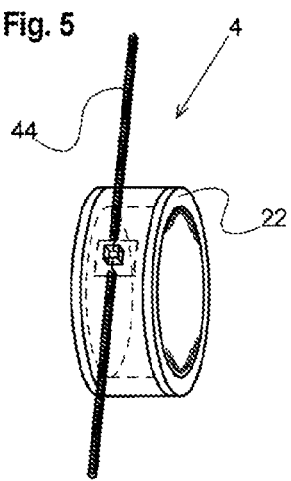
Figure 6:
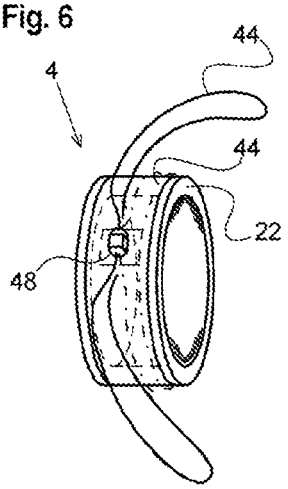

FIG. 1 shows a perspective view of a readout arrangement according to the invention at the transfer of data that can be read out from a piece of jewellery to a reading device, FIG. 2A shows a perspective view of a metal main body of the piece of jewellery according to FIG. 1 during a first production step, FIG. 2B shows an enlarged sectional view of an upper section of the metal main body according to FIG. 2A after an RFID transponder has been mounted, FIG. 2C shows a perspective view of the metal main body according to FIG. 2A at the end of the first production step, FIG. 2D shows a perspective view of the metal main body according to FIG. 2B after mounting an aerogel, FIG. 2E shows a perspective view of the metal main body according to FIG. 2D during a second production step, FIG. 2F shows a perspective view of the piece of jewellery according to FIG. 1 at the end of a third production step, FIG. 3 shows a perspective view of the piece of jewellery in an alternative embodiment, using a monocrystalline material, FIG. 4 shows a perspective view of the piece of jewellery in a further alternative embodiment, using an integrated far field antenna, FIG. 5 shows a perspective view of the piece of jewellery in a further alternative embodiment, using a far field antenna protruding from the metal main body and FIG. 6 shows a perspective view of the piece of jewellery in a further alternative embodiment, using a foldable far field antenna.

FIG. 1 shows a readout arrangement 2 having a piece of jewellery 4 in the form of a finger ring placed on the finger of a user B, and a reading device 6. This has transmitting and receiving means 8 which are connected with a readout electronic device 10. By means of the transmitting and receiving means 8, in this regard an electromagnetic field EF can be established in a near field of the reading device 6. In addition, by means of the transmitting and receiving means 8, activating signals AS can be sent to the piece of jewellery 4.

As can be learned in particular from FIGS. 2A to 2C, for the inductive generation of electric current and for receiving the activating signals AS, the piece of jewellery has a transponder array 12 having a plurality of passive RFID transponders 14 and a storage chip 16, which are held on a metal main body 22. Data that can be read out D are stored in each case in the transponders 14, such as in particular identification data, passwords or other release codes and access/authorisation rights.

By means of positioning the RFID transponders 14 on the part of the wearer or user B of the piece of jewellery 4 within the electromagnetic field EF, according to FIG. 1, the RFID transponders 14 can be supplied with energy and activated, wherein they transfer the data stored on their storage chip 16, such that this in turn be read by the transmitting and receiving means 8 and outputted to the readout electronic device 10. The data that can be read out D are in this regard stored in identical form on several or all RFID transponders 14 of the transponder array 12, such that, even in the case of lack of readability or failure of individual RFID transponders 14, these can be available redundantly and thus transmitted by at least one further RFID transponder 14 to the reading device 6.

The readout electronic device 10 has an analysis software, by means of which, on the basis of the data D incoming from the respective RFID transponder 14, an access or authorisation right of the user B of the piece of jewellery 4 can be verified. Inasmuch as an appropriate access for authorisation rights exists, a release signal FS is outputted to an electronic device 18 of a safety unit 20, which for example, as shown, is formed by a lock of a building or of a vehicle. Alternatively to this, the safety unit 20 can for example also be integrated into a data processing system, in order to be able to limit the use of data and/or programs to an authorised group of persons.

The construction or the method for producing the ring-shaped piece of jewellery 4 is described hereinafter with reference to FIGS. 2A to 2F.

As can be learned from FIG. 2A, the metal main body 22, which is for example produced from a precious metal alloy such as for example a gold, silver or platinum alloy, has a receiving opening 24 for placing the piece of jewellery 4 on the finger of the user B. In a first production step, the transponder array 12 consisting of a plurality of RFID transponders 14 is fastened peripherally about the receiving opening 24 on the outer peripheral surface 26 of the metal main body 22. To this end, for example recesses 28 are let into the peripheral surface 26, into which, according to FIG. 2B, a connecting means 30, such as for example an adhesive or a solder, can be introduced, which fixes the RFID transponder 14 concerned with respect to the peripheral surface 26.

As can be learned from FIG. 2B, the RFID transponders 14 are in this regard held spaced from or without contact to the metal main body 22, with the interposition of the connecting means 30, in order to minimise an impairment of the transmitting and receiving of the RFID transponder 14 caused by the metal main body 22. In addition, according to FIG. 2C, the RFID transponders 14 arranged respectively adjacently have a spacing a of 2 to 6 mm also to one another, in order on the one hand to minimise a mutual disturbance and on the other hand to guarantee a closed peripheral transfer of the data that can be read out D.

As can in particular be learned from FIG. 2C, the RFID transponders 14 of the transponder array 12 have in each case an antenna structure integrated into a chip housing 32, which functions as a near field antenna 34 with a range of up to 2 cm.

For the special protection of the RFID transponders 14 map particularly with regard to the effects of heat during the further production methods and/or during the use of the piece of jewellery 4, as shown in FIG. 2D, these can be encased additionally in an aerogel 36, or embedded therein.

In a second production step, the RFID transponders 14 are then, according to FIG. 2E, covered with a non-metallic material 38, which serves particularly for designing the piece of jewellery 4 or for at least partial enclosing of and for the protection of the RFID transponders 14. To this end, for example lacquers, ceramic materials or plastics can be used, which on one hand support a qualitative impression of the piece of jewellery 4 and at the same time guarantee an uninterrupted exchange of signals between the transponder array 12 and the reading device 6. In the embodiment shown in FIG. 2E, the non-metallic material 38 is formed by a strip-shaped carbon fibre structure 40, which is fastened to the outer peripheral surface 26 of the metal main body 22 with the interposition of the peripheral transponder array 12.

In a third production step, the metal main body 22, with the carbon fibre structure 40 mounted with the interposition of the transponder array 12, is subjected to a temperature of between 180 and 220°, in order to embed the individual RFID transponders 14 in the carbon fibre structure 40 which deforms in a viscous manner at these temperatures. Here, the aerogel 36 provided between the transponder array 12 and the carbon fibre structure 40 prevents a dangerous increase in temperature at the RFID transponders 14. After an additional post-processing, in this manner the finished piece of jewellery 4 can be obtained with a carbon fibre structure 40 polished on the outside, according to FIG. 2F.

Alternatively to the embodiment according to FIG. 2F, the non-metallic material, according to FIG. 3, can be formed at least portionally also by an amorphous or crystalline gemstone, in particular by a monocrystalline material 42, such as for example in the form of cut zirconia stones.

In a further alternative embodiment, the piece of jewellery 4 can have, alternatively or additionally to the integrated near field antenna 34 of the transponder array 12 according to FIG. 2B, also a far field antenna 44 with a range of more than 2 cm, which to this end for example extends across a material length of at least 8.5 cm. As shown in FIG. 4, the field antenna 44 can to this end be embedded in a sinuous or curved shape in an outer surface 46 of the piece of jewellery 4, and in this regard themselves serve as a design element.

Alternatively to this integrated accommodation, according to FIGS. 5 and 6, the field antenna 44 can also protrude from the metal main body 22, wherein the protruding position can be provided either permanently or also only temporarily by means of a freely-chosen folding mechanism 48, in order to unfold the far field antenna 44 as required and otherwise to keep it in a resting position on the metal main body 22 and as is shown in FIG. 6 by dot-dashed lines.

In any case, during the use of the piece of jewellery 4, according to FIG. 1, this is positioned in the electromagnetic field EF of the reading device 6, such that a least one of the RFID transponders 14 provided thereon can be activated by the activating signal AS. As a result, the RFID transponder 14 concerned transmits the data D stored on its storage chip 16, which in turn can be received and processed by the reading device 6.

In order, during this signal exchange, also to be able to cover frequency shifts which can be caused by the individual shape of the piece of jewellery 4, the transmitting of the activating signal AS he takes place successively with various transmitting and receiving frequencies which are stored in the readout electronic device 10. The stored frequencies here preferably cover all frequency shifts which can be expected for a production series of the piece of jewellery 4.

Furthermore, a temporal coding can be provided on the readout electronic device 10, which makes the forwarding of the release signal FS dependent on a specified temporal positioning of the piece of jewellery 4 in the electromagnetic field EF of the reading device 6. Thus, the opening or releasing of the electronic and/or mechanical safety device 20 can be made dependent not only on the data stored on the piece of jewellery 4 being made available, but also on a coded implementation of the reading procedure which is known only to the legitimate owner of the piece of jewellery 4.

Reference is made to the fact that all above-described elements and characteristics of the various embodiments of the object according to the invention are interchangeable or can be combined, in as much as an exchange or a combination thereof is not ruled out for technical reasons.

The invention claimed is:

1. A ring-shaped piece of jewellery, comprising:
   a metal main body which forms a receiving opening, the main body having a groove extending about an entire circumference of the main body; and
   an RFID transponder on which data that can be read out are stored, the RFID transponder being connected with an antenna structure by which signals can be exchanged with a reader device,
   wherein the RFID transponder is part of a transponder array having at least two further RFID transponders arranged in the groove, and
   wherein the transponder array has a distance of 2 to 6 mm between two adjacent RFID transponders.

2. The ring-shaped piece of jewellery according to claim 1, wherein the data that can be read out are redundantly stored on the further RFID transponders.

3. The ring-shaped piece of jewellery according to claim 1, wherein the RFID transponders are designed at least partially as passive transponders.

4. The ring-shaped piece of jewellery according to claim 1, wherein at least some of the RFID transponders have a near field antenna integrated in a chip housing.

5. A ring-shaped piece of jewellery, comprising:
   a metal main body which forms a receiving opening;
   a transponder array having RFID transponders arranged on a peripheral surface of the metal main body, each RFID transponder having data that can be read out and connected with an antenna structure by which signals can be exchanged with a reader device; and
   at least one far field antenna.

6. The ring-shaped piece of jewellery according to claim 5, wherein at least some of the RFID transponders have a near field antenna integrated in a chip housing.

7. The ring-shaped piece of jewellery according to claim 5, wherein the at least one far field antenna has a retracted position curved along the main body and an extended position extending out from the main body.

8. The ring-shaped piece of jewellery according to claim 1, wherein the RFID transponders are held in a contactless manner spaced from the metal main body.

9. The ring-shaped piece of jewellery according to claim 1, wherein the RFID transponders are covered at least partially by a non-metallic material.

10. The ring-shaped piece of jewellery according to claim 9, wherein the non-metallic material is formed at least partially by a carbon fibre structure, a lacquer or a ceramic.

11. The ring-shaped piece of jewellery according to claim 9, wherein the non-metallic material is formed at least partially by gemstones.

12. A method for producing a ring-shaped piece of jewellery, comprising:
   positioning and fastening RFID transponders on a metal main body;
   encasing the RFID transponders in carbon fibre material; and
   subjecting the carbon fibre material to heat in order to bake the RFID transponders into the carbon fibre material.

13. The production method according to claim 12, wherein the RFID transponder is adhesively bonded to the metal main body with a layer of adhesive.

14. The production method according to claim 12, wherein the carbon fibre material is strip-shaped.

15. The production method according to claim 12, wherein, prior to the second step encasing the RFID transponders, the RFID transponders are embedded in an aerogel.

16. A method for operating a readout arrangement with the ring-shaped piece of jewellery according to claim 1, and a reading device, comprising:
   in a first step, an activating signal with a transmitting and receiving frequency is transmitted to the piece of jewellery by a transmitting device of the reading device; and
   in a second step, the data that can be read out are transferred from the piece of jewellery to a receiving device of the reading device,
   wherein the transmission of the activating signal takes place successively with different transmitting and receiving frequencies.

17. The operating method according to claim 16, wherein the transfer of the data that can be read out takes place as a function of a predetermined temporal positioning of the piece of jewellery in a receiving region of the reading device.

18. The operating method according to claim 16, wherein the reading device is connected with an electronic and/or mechanical safety device.

19. The ring-shaped piece of jewellery according to claim 1, wherein a non-metallic material is formed in the groove.

20. The ring-shaped piece of jewellery according to claim 19, wherein the non-metallic material is a carbon fibre structure, a lacquer or a ceramic.

21. A ring-shaped piece of jewellery, comprising:
   a metal main body which forms a receiving opening; and
   an RFID transponder on which data that can be read out are stored, the RFID transponder being connected with an antenna structure by which signals can be exchanged with a reader device,
   wherein the RFID transponder is part of a transponder array having at least two further RFID transponders arranged on a peripheral surface of the metal main body,
   wherein the transponder array has a distance of 2 to 6 mm between two adjacent RFID transponders, and
   wherein the RFID transponders are at least partially covered by a non-metallic material which is formed at least partially by a carbon fibre structure.

* * * * *